3,276,958
PYRIDINE SULFONAMIDE DIURETICS
John B. Bicking, Lansdale, Pa., assignor to Merck & Co.,
Inc., Rahway, N.J., a corporation of New Jersey
No Drawing. Original application Apr. 6, 1959, Ser. No.
804,137. Divided and this application Mar. 2, 1962,
Ser. No. 176,925
7 Claims. (Cl. 167—65)

This application is a division of my copending U.S. patent application, Serial No. 804,137, filed April 6, 1959, now abandoned.

This invention relates to novel diuretic compounds in the form of substituted pyridine sulfonamides and alkali metal salts thereof. 6-substituted pyridine sulfonamides have the structural formula:

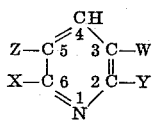

where X is selected from the group consisting of hydrogen, carboxymethylmercapto, acetamido, p-carboxyphenylsulfonamido and thioureido, and W, Y and Z are selected from the group consisting of hydrogen and sulfamyl.

The new compounds in accordance with this invention are useful chemo-therapeutic agents particularly because of their diuretic properties. The compounds can be administered in therapeutic dosages in conventional vehicles as in the form of a tablet, since they are effective when administered orally as well as when injected. Since the alkali metal salts of the compounds of this invention are also readily soluble in an isotonic aqueous medium, injectable solutions can be prepared by dissolving the compounds in the selected medium. The alkali metal salts are stable of themselves, although preservatives may be added if desired.

The dosage of the 6-substituted pyridine sulfonamides may be varied over a wide range and for this reason, scored tablets containing 100, 150, 250, and 500 milligrams of the active ingredient may be made available to the physician for symptomatic adjustment of the dosage to the individual patient. These dosages are well below the toxic or lethal dose of the compound.

The alkali metal salts of the compounds of this invention are prepared with convenience by dissolving the compound in an aqueous or alcoholic solution of the selected alkali metal hydroxide and, if desired, isolating the salt by evaporating the solvent. Any of the conventional alkali metal salts, such as sodium, potassium, lithium or the like salts, can be prepared by this method or by any other methods conventionally used and well known to skilled organic chemists.

The preparation of these compounds is more fully described in the following examples. It is to be understood, however, that the examples are illustrative of the methods employed for their preparation and are not to be construed as limiting the invention to the particular reaction conditions specifically described.

EXAMPLE 1

*2-(carboxymethylmercapto)pyridine-5-sulfonamide*

A solution of 2-chloropyridine-5-sulfonamide (1.9 g., 0.01 mole) and 0.9 g. (0.01 mole) of thioglycolic acid in 30 cc. of 5% sodium hydroxide solution was heated 3 hours on the steam bath. Acidification gave the product which when recrystallized from water had a melting point of 162–164° C.

An analysis of the product showed that it corresponded closely to the empirical formula $C_7H_8N_2O_4S_2$, confirming that the compound was 2-(carboxymethylmercapto)pyridine-5-sulfonamide.

EXAMPLE 2

*2-mercaptopyridine-5-sulfonamide*

A solution of 7.6 g. (0.04 mole) of 2-chloropyridine-5-sulfonamide and 4.6 g. (0.06 mole) of thiourea in 100 cc. of ethanol was refluxed 4 hours. The ethanol was removed by vacuum distillation and the residue was dissolved in 60 cc. of 5% sodium hydroxide solution. The solution was acidified to precipitate the mercapto compound which when recrystallized from a water-dimethylformamide mixture had a melting point of 240° C. (decomposition).

An analysis of the product showed that it corresponded closely to the empirical formula $C_5H_6N_2O_2S_2$, confirming it to be 2-mercaptopyridine-5-sulfonamide.

*Pyridine-2,5-disulfonamide*

2-mercaptopyridine-5-sulfonamide (8.5 g., 0.045 mole) was suspended in 125 cc. of a 50% solution of acetic acid in water. The mixture was maintained at 5° C. while chlorine was bubbled in until 13.0 g. had been absorbed. The thick suspension was poured into ice water. The solid was collected and added to 50 cc. of liquid ammonia. There was obtained the disulfonamide which when recrystallized from water-isopropyl alcohol had a melting point of 213–214° C. (decomposition).

An analysis of the product showed that it corresponded closely to the empirical formula $C_5H_7N_3O_4S_2$, confirming that the compound was pyridine-2,5-disulfonamide.

EXAMPLE 3

*2-acetamidopyridine-5-sulfonamide*

A mixture of 5.2 g. (0.03 mole) of 2-aminopyridine-5-sulfonamide and 3.6 g. (0.035 mole) of acetic anhydride was melted over a Bunsen flame. When cooled the mixture solidified. The product when recrystallized from an isopropyl alcohol-water mixture melted at 202–204° C.

An analysis of the product showed that it corresponded closely to the empirical formula $C_7H_9N_3O_3S$, confirming that the compound was 2-acetamidopyridine-5-sulfonamide.

EXAMPLE 4

*2-(p-carboxyphenylsulfonamido)pyridine-5-sulfonamide*

A mixture of 11.2 g. (0.065 mole) of 2-aminopyridine-5-sulfonamide, 15.5 g. (0.07 mole) of p-carboxybenzenesulfonyl chloride and 30 cc. of pyridine was heated 30 minutes on the steam bath. There was then added 100 cc. of water and enough 20% sodium hydroxide solution to make strongly basic. The pyridine was extracted with three portions of ether. The aqueous solution was acidified to precipitate the product which when recrystallized from a water-dimethylformamide mixture had a melting point of 289–290° C.

Analysis of the product showed that it corresponded closely to the empirical formula $C_{12}H_{11}N_3O_6S_2$, confirming that the compound was 2-(p-carboxyphenylsulfonamido)pyridine-5-sulfonamide.

EXAMPLE 4a

*2-thioureidopyridine-5-sulfonamide*

A solution of 8.7 g. (0.05 mole) of 2-aminopyridine-5-sulfonamide and 4.6 g. (0.06 mole) of ammonium thiocyanate in 35 cc. of water and 5 cc. of concentrated hydrochloric acid was refluxed one hour. It was concentrated to one-half volume and cooled to precipitate the product which when recrystallized from a water-isopropyl alcohol mixture had a melting point 183–184° C. (decomposition).

Analysis of the product showed that it corresponded closely to the empirical formula $C_6H_8N_4O_2S_2$, confirming that the compound was 2-thioureidopyridine-5-sulfonamide.

EXAMPLE 5

The product of Example 1 is reacted with an equivalent amount of NaOH, producing the sodium salt of 2-(carboxymethylmercapto)pyridine-5-sulfonamide. The activity of the sodium salt is equivalent to the activity of the corresponding base.

EXAMPLE 6

Compressed tablet containing 250 milligrams of active ingredient per tablet, in a quantity suitable for fifty tablets:

| | Grams |
|---|---|
| Pyridine-2,5-disulfonamide | 12.500 |
| Calcium phosphate, tribasic | 2.095 |
| Methylcellulose, 15 cps., 2%, 3 cc. | 0.060 |
| Starch paste, 10%, 1 part; gelatine solution, 20%, 1 part, 3 cc. | 0.450 |
| | 15.105 |
| Methylcellulose, 15 cps. | 0.750 |
| Talc, dried | 0.750 |
| | 16.605 |

Pyridine-2,5-disulfonamide and calcium phosphate tribasic are mixed together and then passed twice through No. 60 bolting cloth. The methylcellulose solution is then added and thoroughly mixed in the granulation and the mixture then passed through a No. 10 screen. The startch-gelatine solution is then added to the granulation, thoroughly mixed, and passed through a No. 10 screen after which the total granulation is oven dried at between about 120 to 130° F. for 16 to 18 hours, and passed through a No. 18 screen. The methylcellulose is passed through a No. 60 bolting cloth onto this granulation and blended thoroughly therewith after which the talc is passed through a No. 60 bolting cloth and also thoroughly mixed with the granulation. The resulting granulation is compressed into tablets having a $^{13}\!/_{32}''$ standard curvature punch yielding 50 tablets having a thickness of 0.155 to 0.160 inch, ten of which weigh 3.321 grams. The tablets have a hardness of 5 to 6 kilograms measured by the Monosanto Chemical Company tablet hardness tester apparatus, and a disintegration time of 12 minutes when tested by the U.S.P. tablet disintegrating apparatus (U.S. pharmacopoeia, 15th edition, p. 937).

The same procedure is applicable to the other compounds described herein.

EXAMPLE 7

The following is a suitable mixture, showing appropriate quantities per tablet:

| | Mgm. |
|---|---|
| 2-acetamidopyridine-5-sulfonamide | 250 |
| Calcium phosphate tribasic | 40 |
| Startch (as 13.5% starch paste) | 12.5 |
| Total | 302.5 |

To the foregoing, the following mixture is added:

| | |
|---|---|
| Corn starch | 15 |
| Magnesium stearate | 2.5 |
| Total weight | 320.0 |

The above ingredients are mixed, bolted, and compressed into tablets in substantially the same manner described in Example 6.

EXAMPLE 8

Activity tests of the compounds of Examples 1–4 revealed that they were active at the dosages specified in the following table. The table shows the fraction of a full dose at which activity was found. A full I.V. dose is conventionally and arbitrarily set at an initial priming dose of 25 milligrams per kilogram of body weight followed by an infusion of 30 mg./kg./hr. (I.V.). The table also shows activity when administered orally (P.O.). The full oral dose is conventionally and arbitrarily set at 30 mg./kg. The table further shows the $LD_{50}$ for each compound, expressed in mg. per kg. of body weight. The activity tests were run in dogs and the $LD_{50}$ was determined in mice.

| Compound | Effective Dose I.V. | P.O. | $LD_{50}$ |
|---|---|---|---|
| 2-(Carboxymethylmercapto) pyridine-5-sulfonamide | ¼ | | >600 |
| Pyridine-2,5-disulfonamide | ½0 | | >600 |
| 2-Acetamidopyridine-5-sulfonamide | ¼ | | >600 |
| 2-(p-Carboxyphenylsulfonamido)pyridine-5-sulfonamide | ¼ | | >600 |
| 2-Thioureidopyridine 5-sulfonamide | | ¼ | >600 |

While the above examples have described the preparation of certain specific compounds and a certain specific dosage form suitable for administering the novel compound of this invention in human therapy, it is to be understood that the invention is not to be limited by these examples or by the specific reaction conditions described for the preparation of the compounds or by the specific ingredients included in the pharmaceutical preparation. On the contrary, it is understood that this invention embraces variations and modifications, including the use of equivalent methods of preparation. However, it is also to be understood that this invention is specifically limited to the compounds defined in the claims and does not extend to the substitution of any other groups for those which are specifically defined in the claims.

What is claimed is:

1. The process of effecting diuresis in a mammal having excessive fluid retention which comprises administering parenterally to said mammal a diuretic amount of a compound having the formula

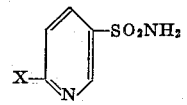

wherein X is selected from the group consisting of carboxymethylmercapto,
acetamido,
sulfamyl,
p-carboxyphenylsulfonamido, and
thioureido.

2. A process as claimed in claim 1 wherein a diuretic amount of the compound is administered orally to said mammal.

3. The process of effecting diuresis in a mammal having excessive fluid retention which comprises administering parenterally to said mammal a diuretic amount of 2-(carboxymethylmercapto)pyridine-5-sulfonamide.

4. The process of effecting diuresis in a mammal having excessive fluid retention which comprises administering parenterally to said mammal a diuretic amount of pyridine-2,5-disulfonamide.

5. The process of effecting diuresis in a mammal having excessive fluid retention which comprises administering parenterally to said mammal a diuretic amount of 2-acetamidopyridine-5-sulfonamide.

6. The process of effecting diuresis in a mammal having excessive fluid retention which comprises administering parenterally to said mammal a diuretic amount of 2-(p-carboxyphenylsulfonamido)pyridine-5-sulfonamide.

7. The process of effecting diuresis in a mammal having excessive fluid retention which comprises administering parenterally to said mammal a diuretic amount of 2-thioureidopyridine-5-sulfonamide.

References Cited by the Examiner

UNITED STATES PATENTS

| | | | |
|---|---|---|---|
| 2,170,209 | 8/1939 | Naegeli | 260—294.8 |
| 2,541,902 | 2/1951 | Zienty | 260—294.8 |
| 2,763,660 | 9/1956 | Young. | |
| 2,835,702 | 5/1958 | Schultz. | |
| 2,860,165 | 11/1958 | Schraufstatter. | |
| 2,944,057 | 7/1960 | Korman | 167—65 |

FOREIGN PATENTS 705,944   3/1954   Great Britain.

OTHER REFERENCES

Caldwell et al.: J.A.C.S., vol. 64, pages 1695–1698 (1942).

JULIAN S. LEVITT, *Primary Examiner.*

FRANK CACCIAPAGLIA, JR., LEWIS GOTTS,
*Examiners.*

EUGENE FRANK, L. RANDALL, *Assistant Examiners.*